United States Patent
Tolentino et al.

(12)

(10) Patent No.: US 9,457,768 B2
(45) Date of Patent: Oct. 4, 2016

(54) VORTEX DAMPING WIPER BLADE

(75) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 0 days.

(21) Appl. No.: 13/453,601

(22) Filed: Apr. 23, 2012

(65) Prior Publication Data

US 2012/0266405 A1    Oct. 25, 2012

Related U.S. Application Data

(60) Provisional application No. 61/477,908, filed on Apr. 21, 2011.

(51) Int. Cl.
B60S 1/38 (2006.01)

(52) U.S. Cl.
CPC ............ B60S 1/3863 (2013.01); B60S 1/3848 (2013.01); B60S 1/3806 (2013.01); B60S 1/3808 (2013.01); B60S 1/3867 (2013.01); B60S 2001/3843 (2013.01)

(58) Field of Classification Search
CPC .... B60S 1/3806; B60S 1/3808; B60S 1/381; B60S 1/3863; B60S 1/3848; B60S 1/3867
USPC .......... 15/250.201, 250.361, 250.32, 250.43, 15/250.44
See application file for complete search history.

(56) References Cited

U.S. PATENT DOCUMENTS

| | | |
|---|---|---|
| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |

(Continued)

FOREIGN PATENT DOCUMENTS

| | | |
|---|---|---|
| AR | 206463 | 7/1976 |
| AU | 409933 | 2/1971 |

(Continued)

OTHER PUBLICATIONS

International Search Report mailed Oct. 19, 2012 for PCT/US2012/048843 filed Jul. 30, 2012.

(Continued)

*Primary Examiner* — Michael Jennings
(74) *Attorney, Agent, or Firm* — Cozen O'Connor

(57) ABSTRACT

A windshield wiper blade cover and a wiper blade having same. The windshield wiper blade cover being capable of being disposed on the top side of a beam of a wiper blade, and comprising two longitudinal sides, two outer ends and a top surface, where the top surface of the cover has a base portion having a height and a raised portion having a height, the height of the raised portion is greater than the height of the base portion, and the height of the raised portion gradually decreases as the raised portion approaches the outer ends of the cover. The wiper blade comprising a cover as described above, a beam having two ends, two longitudinal sides, a top side and a bottom side, a central bridge disposed on the top side of the beam, a wiper strip disposed on the bottom side of the beam, and the cover disposed on the top side of the beam.

20 Claims, 8 Drawing Sheets

(56) References Cited

U.S. PATENT DOCUMENTS

| | | |
|---|---|---|
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,537 A | 3/1975 | Bianchi |
| 3,879,793 A | 4/1975 | Schlegel |
| 3,881,213 A | 5/1975 | Tilli |
| 3,881,214 A | 5/1975 | Palu |
| D236,337 S | 8/1975 | Deibel |
| 3,942,212 A | 3/1976 | Steger et al. |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,308,635 A | 1/1982 | Maiocco |
| 4,309,790 A | 1/1982 | Bauer et al. |
| 4,339,839 A | 7/1982 | Knights |
| 4,342,126 A | 8/1982 | Neefeldt |
| 4,343,063 A | 8/1982 | Batt |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,307,536 A | 5/1994 | Lescher |
| 5,311,636 A | 5/1994 | Lee |
| 5,312,177 A | 5/1994 | Coulter |

(56) References Cited

U.S. PATENT DOCUMENTS

| | | |
|---|---|---|
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,454,135 A | 10/1995 | Okuya et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,497,528 A | 3/1996 | Wu |
| 5,509,166 A | 4/1996 | Wagner et al. |
| D370,199 S | 5/1996 | Kim |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| D379,613 S | 6/1997 | Chen |
| D382,848 S | 8/1997 | Chen |
| 5,661,870 A | 9/1997 | Eustache et al. |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| 5,875,672 A | 3/1999 | Fourie et al. |
| 5,885,023 A | 3/1999 | Witek et al. |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,920,947 A | 7/1999 | Varner |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,055,697 A | 5/2000 | Wollenschlaeger |
| 6,063,216 A | 5/2000 | Damm et al. |
| D427,134 S | 6/2000 | Lee |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 * | 1/2002 | Charng ............... 15/250.201 |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| D462,044 S | 8/2002 | Gfatter et al. |
| 6,427,282 B1 | 8/2002 | Kotlarski |
| 6,434,780 B1 | 8/2002 | Kotlarski |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,516,491 B2 | 2/2003 | Merkel et al. |
| 6,523,218 B1 | 2/2003 | Kotlarski |
| 6,530,111 B1 | 3/2003 | Kotlarski |
| D472,510 S | 4/2003 | Lin |
| D473,180 S | 4/2003 | Sun |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |

(56) References Cited

U.S. PATENT DOCUMENTS

| | | |
|---|---|---|
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,228,588 B2 | 6/2007 | Kraemer et al. |
| D546,669 S | 7/2007 | Sheppard et al. |
| D547,713 S | 7/2007 | Goeller |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,337,900 B2 | 3/2008 | Reiber et al. |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D577,324 S | 9/2008 | McCray |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| 7,526,832 B2 | 5/2009 | Matsumoto et al. |
| 7,527,151 B2 | 5/2009 | Park |
| D593,480 S | 6/2009 | Kim |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,596,479 B2 | 9/2009 | Weiler et al. |
| 7,603,741 B2 | 10/2009 | Verelst et al. |
| 7,603,742 B2 * | 10/2009 | Nakano et al. .......... 15/250.201 |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,504 B1 | 4/2011 | Chiang |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |

(56) References Cited

U.S. PATENT DOCUMENTS

| | | |
|---|---|---|
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |
| 7,989,955 B2 | 8/2011 | Yagi |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,026,645 B2 | 9/2011 | Stubner et al. |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| D658,494 S | 5/2012 | Raimer et al. |
| 8,181,308 B2 * | 5/2012 | Kwon et al. ............... 15/250.46 |
| 8,186,002 B2 | 5/2012 | Kinnaert et al. |
| 8,191,200 B2 | 6/2012 | Kim |
| 8,261,403 B2 | 9/2012 | Ehde |
| 8,261,405 B2 | 9/2012 | Kim et al. |
| 8,272,096 B2 | 9/2012 | Wilms et al. |
| 8,381,348 B2 | 2/2013 | Egner-Walter et al. |
| 8,413,291 B2 * | 4/2013 | Wu ........................... 15/250.201 |
| 8,434,621 B2 | 5/2013 | Hun et al. |
| D684,862 S | 6/2013 | DiFranza |
| 8,474,088 B2 | 7/2013 | Wu |
| 8,490,239 B2 | 7/2013 | Ehde |
| 8,505,724 B2 | 8/2013 | Bult et al. |
| 8,510,897 B2 | 8/2013 | Ku |
| 8,510,898 B2 | 8/2013 | Ku |
| 8,544,137 B2 | 10/2013 | Thienard |
| 8,555,456 B2 | 10/2013 | Ehde |
| D692,750 S | 11/2013 | Ehde et al. |
| 8,613,357 B2 | 12/2013 | Putnam |
| D702,619 S | 4/2014 | Kim |
| D704,620 S | 5/2014 | Kim |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 * | 12/2004 | Matsumoto et al. ..... 15/250.201 |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2006/0010636 A1 | 1/2006 | Vacher |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 * | 8/2006 | Hoshino et al. ............ 15/250.43 |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 * | 12/2006 | Huang ..................... 15/250.201 |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 * | 11/2007 | Kim et al. ................. 15/250.29 |
| 2008/0083082 A1 | 4/2008 | Rovaart et al. |
| 2008/0098554 A1 * | 5/2008 | Cho ......................... 15/250.32 |
| 2008/0196192 A1 | 8/2008 | Yao |
| 2008/0222830 A1 | 9/2008 | Chiang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0064440 A1 | 3/2009 | Boland |
| 2009/0158545 A1 | 6/2009 | Grasso et al. |
| 2009/0172910 A1 | 7/2009 | De Block et al. |
| 2009/0178226 A1 | 7/2009 | Lee et al. |
| 2010/0005608 A1 | 1/2010 | Chien |
| 2010/0005609 A1 | 1/2010 | Kim |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 * | 9/2010 | Chien ..................... 15/250.201 |
| 2010/0281645 A1 | 11/2010 | Kim et al. |
| 2011/0047742 A1 | 3/2011 | Kim et al. |
| 2011/0072607 A1 | 3/2011 | Van Baelen et al. |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0067675 A1 | 3/2013 | Chien |
| 2013/0104334 A1 | 5/2013 | Depondt |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0192016 A1 | 8/2013 | Kim |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0333145 A1 | 12/2013 | Depondt |
| 2013/0333146 A1 | 12/2013 | Depondt |

(56) References Cited

U.S. PATENT DOCUMENTS

| | | | |
|---|---|---|---|
| 2014/0026348 A1 | 1/2014 | Schaeuble | |
| 2014/0026349 A1 | 1/2014 | Schaeuble | |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | PI0007263 | 1/2009 |
| BR | PI0519259 | 1/2009 |
| BR | 0006917 | 8/2009 |
| BR | PI0606903 | 8/2009 |
| BR | PI0901324 | 4/2010 |
| BR | PI0006963 | 9/2010 |
| BR | PI0706762 | 4/2011 |
| BR | PI1000961 | 6/2011 |
| BR | PI0621265 | 12/2011 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2515071 | 8/2004 |
| CA | 2242776 | 7/2005 |
| CA | 2553977 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2835703 | 11/2012 |
| CA | 2843527 | 1/2013 |
| CA | 2843637 | 2/2013 |
| CA | 2843644 | 2/2013 |
| CA | 2797693 | 5/2013 |
| CA | 2799267 | 6/2013 |
| CA | 2740384 | 7/2013 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183008 | 7/2013 |
| CN | 103183009 | 7/2013 |
| CN | 103223923 | 7/2013 |
| CN | 103228498 | 7/2013 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 19650929 | 6/1998 |
| DE | 19734843 | 2/1999 |
| DE | 19745460 | 4/1999 |
| DE | 19814609 | 10/1999 |
| DE | 10054287 | 5/2002 |
| DE | 10228494 A1 | 1/2004 |
| DE | 10320930 | 11/2004 |
| DE | 102004019157 | 11/2005 |
| DE | 102004061088 | 6/2006 |
| DE | 102005019389 | 11/2006 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |

(56) References Cited

FOREIGN PATENT DOCUMENTS

| | | |
|---|---|---|
| EP | 0594451 | 4/1994 |
| EP | 0633170 | 1/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1846274 | 10/2007 |
| EP | 1849666 A1 | 10/2007 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2143603 | 1/2010 |
| EP | 2146877 | 1/2010 |
| EP | 2230140 | 9/2010 |
| EP | 2236366 | 10/2010 |
| EP | 2253520 | 11/2010 |
| EP | 2258592 | 12/2010 |
| EP | 1559623 | 1/2011 |
| EP | 2321160 | 5/2011 |
| EP | 2338747 | 6/2011 |
| EP | 2426017 | 3/2012 |
| FR | 2736025 A1 | 1/1997 |
| FR | 2738201 A1 | 3/1997 |
| FR | 2747976 | 10/1997 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 2008037388 A | 2/2008 |
| KR | 10-089115 | 2/2009 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2013002710 | 5/2013 |
| MX | 2013006881 | 7/2013 |
| MY | 122308 | 4/2006 |
| MY | 122563 | 4/2006 |
| MY | 128028 | 1/2007 |
| MY | 128970 | 3/2007 |
| PT | 1800978 | 5/2011 |
| PT | 1800977 | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 105237 | 6/2011 |
| RU | 108350 | 9/2011 |
| RU | 108741 | 9/2011 |
| TW | M404153 U1 | 5/2011 |
| TW | 201325952 | 7/2013 |

(56) References Cited

FOREIGN PATENT DOCUMENTS

| | | |
|---|---|---|
| TW | 201325953 | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/051483 | 5/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |

OTHER PUBLICATIONS

International Search Report mailed Sep. 19, 2012 for PCT/US2012/048617 filed Jul. 27, 2012.
International Search Report mailed Sep. 19, 2012 for PCT/US2012/048262 filed Jul. 26, 2012.

* cited by examiner

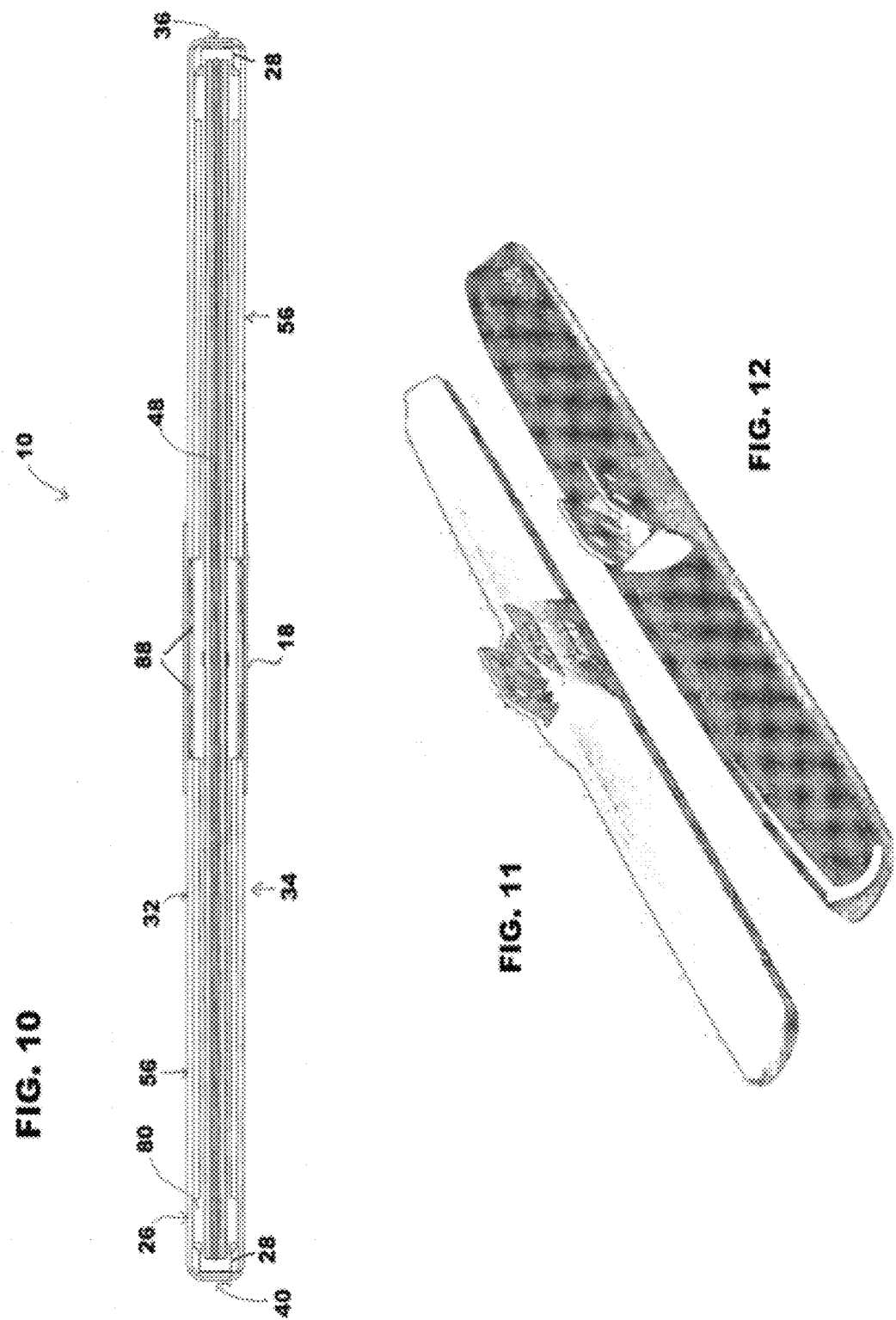

VORTEX DAMPING WIPER BLADE

CROSS REFERENCE TO RELATED APPLICATIONS

This application claims the benefit of U.S. Provisional Application No. 61/477,908 filed Apr. 21, 2011, the disclosure of which is hereby incorporated herein by reference in its entirety.

FIELD OF THE INVENTION

This invention relates to the field of windshield wiper blades, and in particular to the beam blade.

BACKGROUND

Typical wiper blades used on vehicles are plagued with numerous persistent drawbacks. Among these drawbacks are two common and interrelated drawbacks are of interest. The first such drawback is wiper blade separation from the surface of the windshield. The second such drawback is wind noise generated by the air moving over the wiper blade as a vehicle travels at speed.

One persistent cause of wiper blade separation from the windshield is the lack of sufficient downward force from the wiper blade onto the windshield. A major contributing factor to insufficient downward force involves wind lift. That is, wind passing over the windshield creates a "lifting" force which may cause the wiper blade to lose partial or complete contact with the surface of the windshield, and thus result in uneven or inconsistent clearing of water off the windshield. The wind lift problem has been known in the wiper field for decades, and many attempts have been made to resolve it. For example, see U.S. Pat. Nos. 3,056,991, 3,317,945, 3,879,793, 3,942,212, 6,292,974, 6,944,905, which are incorporated herein by reference in their entirety.

One common solution to the wind lift problem is to add a wind deflection structure, or spoiler, to the top of the wiper blade. On a beam blade, a spoiler is generally affixed to the top of the wiper blade, thereby substantially increasing the height and outer cross-section of the wiper blade overall, and increasing the need for an anti wind-lift structure. Moreover, for cost and ease of manufacture reasons, these spoilers have a uniform cross-sectional profile across the entire length, or substantially the entire length of the wiper blade structure. U.S. Pat. No. 6,944,905, for instance describes a uniformly shaped spoiler, except for the end sections, in which a wall and abrupt corner are used at the end of the wind deflection strip, slanting down to the end of the blade.

Another problem associated with wiper blades is that wind noise generated as a wiper blade is used while the vehicle travels at higher speeds. In general, undesirable wind noise from wiper blades originates in part from air vortices formed by wind contacting a wiper blade. In normal operation, as wind flows over a wiper blade, an air vortex forms behind the wiper blade, that is, on the leeward side of the wiper blade. Moreover, the size of the vortex is proportional to the height of the wiper blade, from its contact point with the windshield to the top of its cross-sectional profile. Thus, a wiper blade with a larger wind deflection structure generates a larger vortex, and therefore more noise.

Generally, wind noise is created as a wiper blade enters a slip stream of wind above the windshield. The wind noise created from wiper blades encountering the slip stream is distracting and makes for a less comfortable overall driving experience. Reduction of such wind noise is therefore a constant concern associated with wiper blade design.

Wiper blade separation from the windshield is a primary concern in wiper blade design because of potential safety hazards that can arise out of poor wiping performance. However, a wiper blade designer should also attempt to minimize the amount of noise caused by the design of the wiper blade in order to allow for a more comfortable driving experience for the driver of the car on which the wiper blades are installed. Wiper blades currently used in the art do not adequately present a solution that addresses the wind lift problem while minimizing the amount of noise generated by the wiper blade.

BRIEF SUMMARY

The foregoing problems of prior wiper blades are resolved or at least substantially reduced and a technical advance is achieved in a low-profile wiper blade that reduces or eliminates wind-lift while damping wind noise. The present invention achieves this through a gradually decreasing-height cover attached to the surface of the beam of the beam blade.

In certain embodiments, the invention comprises a wiper blade having a beam with two ends, two longitudinal sides, a top side and a bottom side. The wiper blade further has a central bridge disposed on the top side of the beam, a wiper strip disposed on the bottom side of the beam and a cover having two longitudinal sides, two outer ends and a top surface. The cover may be disposed on the top side of the beam, and the top surface of the cover has a base portion having a height and a raised portion having a height, wherein the height of the raised portion is greater than the height of the base portion and the height of the raised portion gradually decreases as the raised portion approaches the outer ends of the cover.

Certain embodiments of the invention are directed to a wiper blade cover comprising two longitudinal sides, two outer ends and a top surface, wherein the cover is capable of being disposed on the top side of a beam. The top surface of the wiper blade cover may have a base portion having a height and a raised portion having a height, where the height of the raised portion is greater than the height of the base portion and the height of the raised portion gradually decreases as the raised portion approaches the outer ends of the cover.

Certain embodiments of the invention are directed to a wiper blade comprising a beam having two ends, a central bridge disposed on the beam, and a cover, wherein the cover has a spoiler that tapers from a highest point in the vicinity of the central bridge to a lowest point in the vicinity of the ends of the beam.

In some embodiments where the raised portion of the cover may optionally embody a wind deflection structure that gradually recedes along the length of the cover as it approaches the ends of the wiper blade, such that the tip of the wind deflection structure is either at or near the surface of the base of the cover at the ends of the wiper blade, or has completely receded into the base of the cover before reaching the end of the wiper blade.

In embodiments where the raised portion of the cover of the beam blade does not embody a spoiler, the cover the raised portion that gradually recedes along the length of the cover as it approaches the ends of the wiper blade such that the raised portion of the cover is at or near the surface of the base of the cover, at the ends of the wiper blade, or has completely receded into the base of the cover before reaching the end of the wiper blade. In such embodiments, the raised portion of the cover is preferably curved in order to minimize the effect of the wind on that raised portion.

By gradually receding the top of the cover, whether it is a wind deflection structure or merely a raised portion, along the length of the cover as it approaches the ends of the wiper blade, the vortex formed behind the wiper blade relative to the direction of the oncoming wind is decreased along the length of the wiper blade, and approaching its ends. The decreasing profile of the cover reduces and/or dissipates the vortex, thereby reducing or eliminating the audible noise (to the driver of the vehicle) caused by the vortex.

It is notable that the portion(s) of the cover nearest the middle of the wiper blade need not be the "tallest" portions of the wiper blade. Also, the cover may be one piece, may be two pieces on either side of a connection device or mounting base attached at or near the middle of the beam, or may be made of multiple parts. In embodiments having two (or more) parts of the cover, there may be a cap, or caps, covering gaps in the cover. For instance, in an embodiment having two covers, one for each side of the wiper blade, there may be a cap which covers the inner ends of the two covers, and the connection device or mounting base.

Exemplary embodiments are attached hereto as examples of the invention, both with a wind deflection structure, and with a raised portion of the cover.

BRIEF DESCRIPTION OF THE DRAWINGS

FIG. 10 illustrates a bottom view of a second embodiment of a slim profile wiper blade of the present invention.

FIG. 11 illustrates a perspective view of a third embodiment of the invention.

FIG. 12 illustrates perspective view of a fourth embodiment of the invention.

As is apparent to persons of skill in the art FIGS. 1-12 depict the wiper blades as being flat for convenience and to show the relative relationships between the various parts. However, embodiments of the invention are preferably curved to better perform and contour to the shape of the spherical windshields found on motor vehicles. Accordingly, the scope of the invention is not intended to be limited to flat wiper blades and is intended to include curved embodiments within its scope.

DETAILED DESCRIPTION

Figure 1:
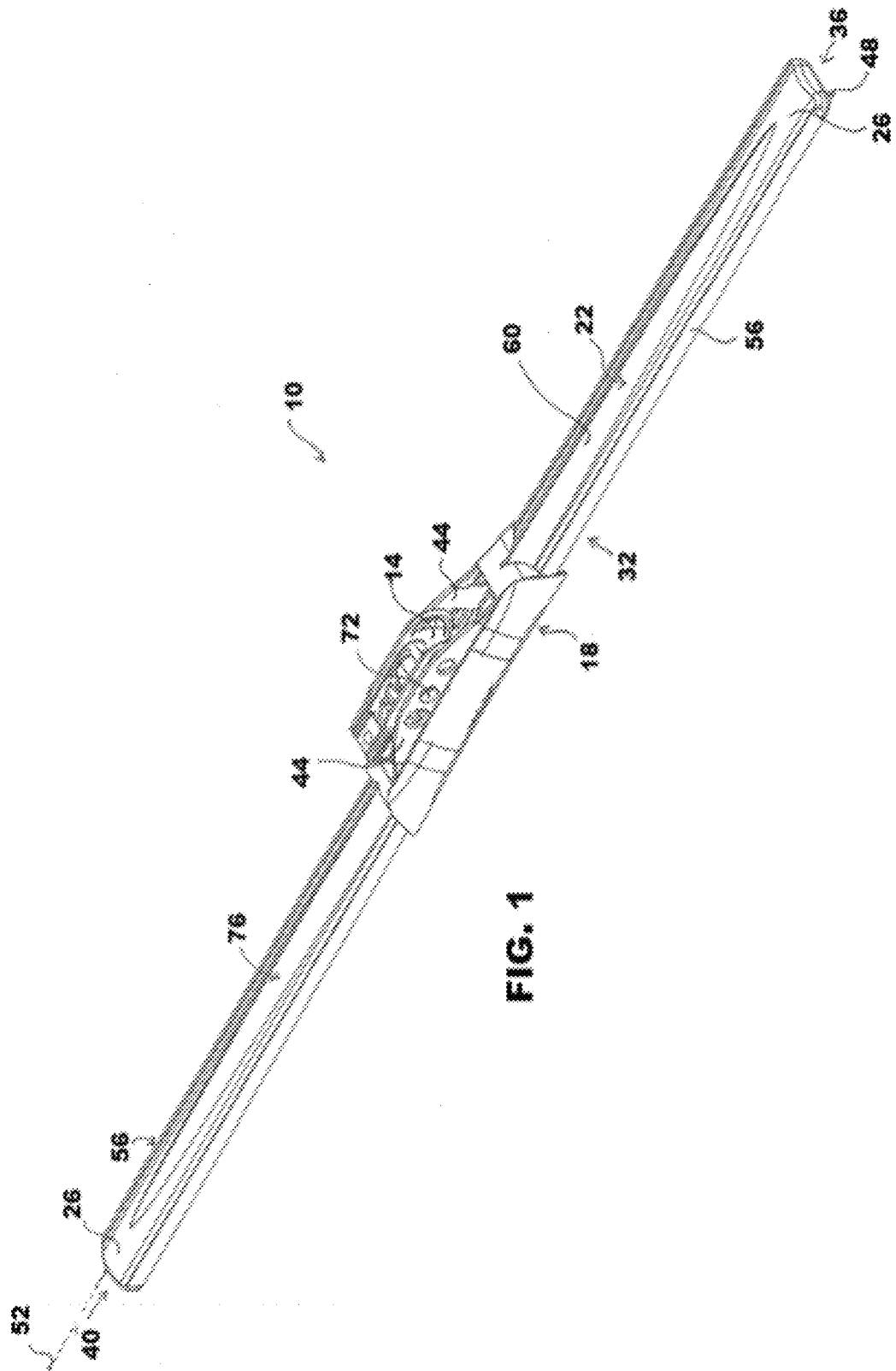
FIG. 1 illustrates a perspective view of a first embodiment of a slim profile wiper blade of the present invention.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. The embodiments discussed below are described in sufficient detail to enable those skilled in the art to practice the subject matter disclosed herein. It is to be understood that the embodiments may be combined, or that other embodiments may be utilized, and that structural and logical variations may be made without departing from the scope of the subject matter disclosed. Accordingly, references to any particular embodiment are not intended to be interpreted as excluding the existence of additional embodiments that also incorporate the recited features. It should also be understood that the drawings are not to scale and in certain instances details have been omitted, which are not necessary for an understanding of the present invention, such as conventional details of fabrication and assembly.

In certain embodiments, the invention comprises a wiper blade having a beam with two ends, two longitudinal sides, a top side and a bottom side. The wiper blade further has a central bridge disposed on the top side of the beam, a wiper strip disposed on the bottom side of the beam and a cover having two longitudinal sides, two outer ends and a top surface. The cover may be disposed on the top side of the beam, and the top surface of the cover has a base portion having a height and a raised portion having a height, wherein the height of the raised portion is greater than the height of the base portion and the height of the raised portion gradually decreases as the raised portion approaches the outer ends of the cover.

In certain embodiments of the invention, the wiper blade may further have a raised portion that forms a wind deflection structure having a generally triangular shape when viewed in cross section. In certain embodiments of the invention, the cover of the wiper blade may be symmetric in shape across a plane that is transverse to the two longitudinal sides of the cover. In certain embodiments of the invention the cover of the wiper blade may be symmetric in shape across a plane that extends vertically through a longitudinal axis of the cover.

In certain embodiments of the invention, the raised portion of the wiper blade may have an apex that merges with the base portion before the outer ends of the cover. In certain embodiments of the invention, the cover of the wiper blade may be provided with two claws that run along the two longitudinal sides of the cover, wherein the longitudinal sides of the beam are disposed in the two claws. In some such embodiments, the claws may end in the vicinity of the outer ends of the cover, and the outer ends of the cover may be provided with a structure that secures the ends of the beam.

In certain embodiments of the invention, the cover of the wiper blade may be a unitary structure and may be provided with a hole to accommodate the central bridge of the wiper blade. In other embodiments of the invention, the cover of the wiper blade may comprises two sections, where each section has an inner end and a gap is provided between the inner ends of the two sections to accommodate the central bridge. In some such embodiments, the wiper blade may have a cap that covers the gap and the inner ends of the two sections of the cover.

Certain embodiments of the invention are directed to a wiper blade cover comprising two longitudinal sides, two outer ends and a top surface, wherein the cover is capable of being disposed on the top side of a beam. The top surface of the wiper blade cover may have a base portion having a height and a raised portion having a height, where the height of the raised portion is greater than the height of the base portion and the height of the raised portion gradually decreases as the raised portion approaches the outer ends of the cover.

In certain embodiments of the invention, the raised portion of the wiper blade cover forms a wind deflection structure having a generally triangular shape when viewed in cross-section. In certain embodiments of the invention the wiper blade cover is symmetric in shape across a plane that is transverse to the two longitudinal sides of the cover. In certain embodiments of the invention, the raised portion of the wiper blade cover may have an apex that merges with the base portion before the outer ends of the cover.

In certain embodiments of the invention, the wiper blade cover may be provided with two claws that run along the two longitudinal sides of the cover, wherein the claws are capable of receiving the longitudinal sides of a beam. In some such embodiments, the claws of the wiper blade cover may end in the vicinity of the outer ends of the cover, and the outer ends of the cover may be provided with a structure capable of securing the ends of the beam.

In certain embodiments of the invention, the wiper blade cover is a unitary structure and is provided with a hole to accommodate the central bridge of the wiper blade. In other embodiments of the invention, the wiper blade cover comprises two sections, each having an inner end, and a gap is provided between the inner ends of the two sections in order to accommodate a central bridge of a wiper blade. In some such embodiments, the wiper blade cover may further be provided with a cap that covers the gap and the inner ends of the two sections of the wiper blade cover.

Certain embodiments of the invention are directed to a wiper blade comprising a beam having two ends, a central bridge disposed on the beam, and a cover, wherein the cover has a spoiler that tapers from a highest point in the vicinity of the central bridge to a lowest point in the vicinity of the ends of the beam.

Figure 3:
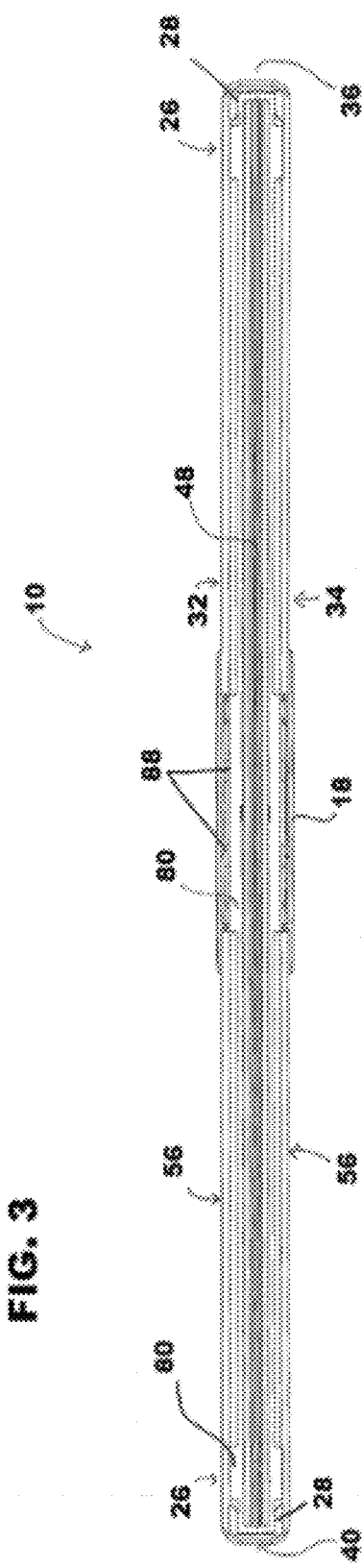
FIG. 3 illustrates a bottom view of a first embodiment of a slim profile wiper blade of the present invention.

Referring to the drawings in general, an elongate, wiper blade 10 may be slender and includes a beam (or support element) 80, a central bridge (or mounting base) 44, a cover 22, a front edge 32, a rear edge 34, opposing ends 26 having front edge 32 and rear edge 34 therebetween, a wiper strip 48 and either a tapered spoiler 60 or a tapered raised portion 61. The wiper blade 10 may optionally further comprise a connector 14. As best shown in FIG. 3, wiper blade 10 may have an outer edge or perimeter 56 formed by front edge 32, left end 40, rear edge 34, and right end 36. The front edge 32 and rear edge 34 may also be called the longitudinal sides of the wiper blade. The perimeter 56 is generally defined by a curvilinear cover 22, having either a tapered spoiler 60 or a tapered raised portion 61. The tapered spoiler 60 or tapered raised portion 61 constitute a highly effective means for damping air vortices. Connector 14, which is removably attached to the central bridge 44, secures the wiper blade 10 to a driver arm (not shown) that actuates the wiper blade 10. As is well known in the art, different kinds of connectors may be used to connect the wiper blade 10 to different wiper arms, or multi-arm connectors can be used to connect to various types of arms. Additionally, the central bridge 44 may be designed to connect to a particular type (or types) of wiper arm(s), thereby making a connector 14 unnecessary.

Figure 2:
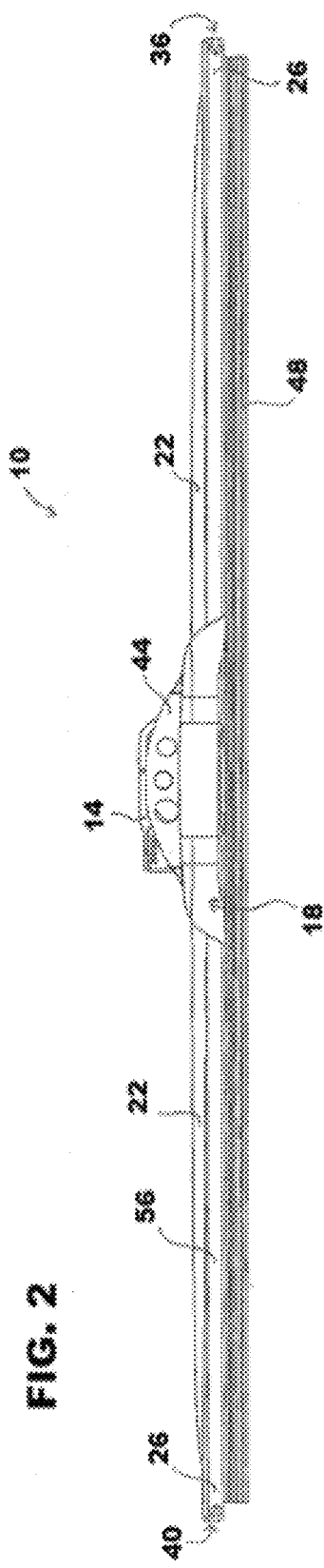
FIG. 2 illustrates a front view of a first embodiment of a slim profile wiper blade of the present invention.
Figure 4:
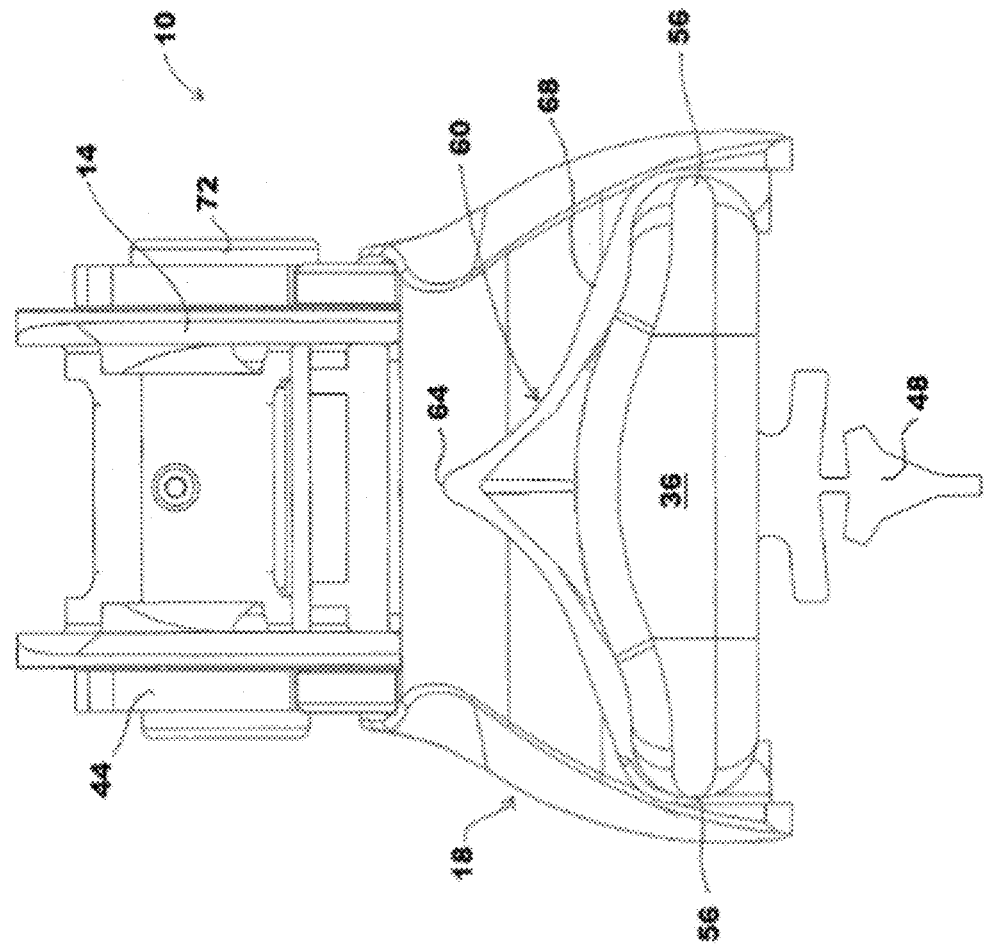
FIG. 4 illustrates a right end view of a first embodiment of a slim profile wiper blade of the present invention.
Figure 5:
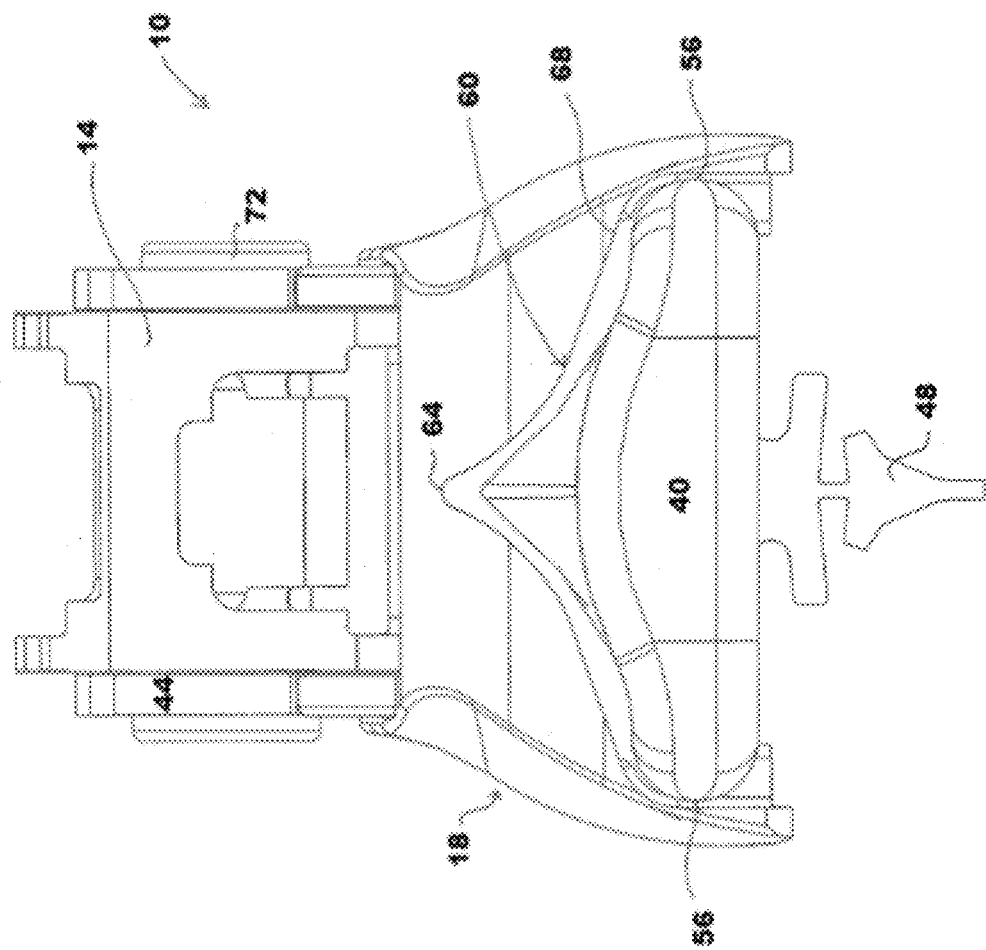
FIG. 5 illustrates a left end view of a first embodiment of a slim profile wiper blade of the present invention.

FIGS. 1-5 depict a first embodiment of the wiper blade 10 having a cover 22 with a top surface 76 with a pedestal or base region that supports and defines the outer boundary of the a raised portion that embodies a tapered spoiler 60, having a generally triangular shape when viewed in cross-section (FIGS. 4 & 5). The tapered spoiler 60 provides a curvilinear outer surface 68, best shown in FIG. 4. The tapered spoiler 60 provides a centrally elevated area most clearly defined at apex 64 (FIG. 4), which extends along axis 52 (FIG. 1). In use, the tapered spoiler 60 acts as a means for reducing wind vortices because it allows wind to pass over it with minimal or no noise effect. Specifically, the novel low-profile, longitudinally tapered design of tapered spoiler 60 provides minimized or negligible vortex at the leeward side of wiper blade 10. The tapering of the tapered spoiler 60 is gradual, and tapering downwards towards the ends of the wiper blade 36, 40. Indeed, as shown in FIGS. 1 & 2, the height of the tapered spoiler 60 may recede into the height of the base portion of the top surface of the cover 22 in the vicinity of (either before the end of or at the end of) the outer ends of the cover such that the tapered spoiler 60 merges with the base portion. Alternatively, as shown in FIG. 12, the height of the tapered spoiler may still be greater than the height of the base portion of the top surface of the cover at the ends of the cover 22.

The wiper blade 10 may also optionally further comprise a covering cap 18, which covers the gaps between the cover and the central bridge 44. As shown in FIGS. 1-5, the cover 22 may comprise two sections, each having an inner end in the vicinity of the central bridge 44. As best seen in FIG. 3, the sections of the cover 22 thereby have a gap between their respective inner ends which accommodates the central bridge. As shown in FIG. 1, the covering cap 18 covers this gap and the inner ends of the cover sections, and is provided with a hole to accommodate the central bridge 44. This covering cap may also be vertically extended to cover the connection area between wiper arm, the connector 14 (if one is used), and the central bridge 44 (not shown).

Alternatively, as shown in FIGS. 11 and 12, the cover may also be a single piece, shaped to cover the central bridge, thereby obviating the need for a covering cap 18. In such embodiments, the cover 22 is provided with a hole which can accommodate the central bridge. 44. As shown in FIGS. 11 and 12, the portion of cover 22 surrounding the central bridge 44 may cover only the connection between the beam 80 and the central bridge 44, leaving the connecting area between the central bridge 44, wiper arm and connector 14 (if any) uncovered. Alternatively, the cover 22 may extend vertically to also cover the connection area between the wiper arm, connector 14 (if one is used) and the central bridge 44 (not shown).

As shown in FIGS. 1 and 11, the tapered spoiler 60 may be located in the center of the cover, or towards the rear edge of the cover 22, and may be symmetric across the plane extending vertically through the axis 52. Alternatively, as shown in FIG. 12, the apex 64 of the tapered spoiler 61 may be nearer to one longitudinal side (such as the rear edge 34) than to the other. As shown in FIGS. 2, 11 and 12 the cover may also be symmetric across the plane that is transverse to the longitudinal sides and axis 52.

Figure 6:
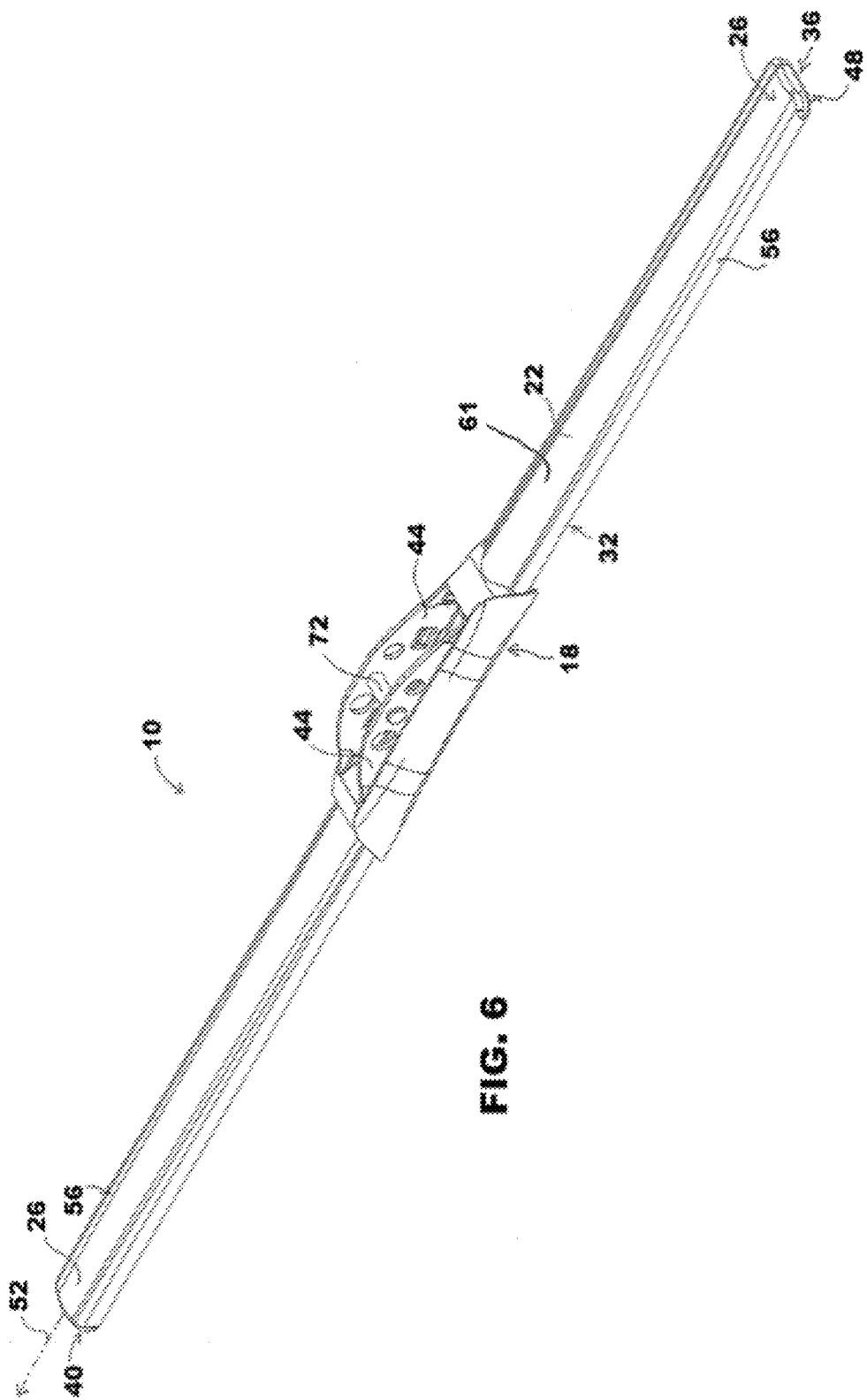
FIG. 6 illustrates a perspective view of a second embodiment of a slim profile wiper blade of the present invention.
Figure 7:
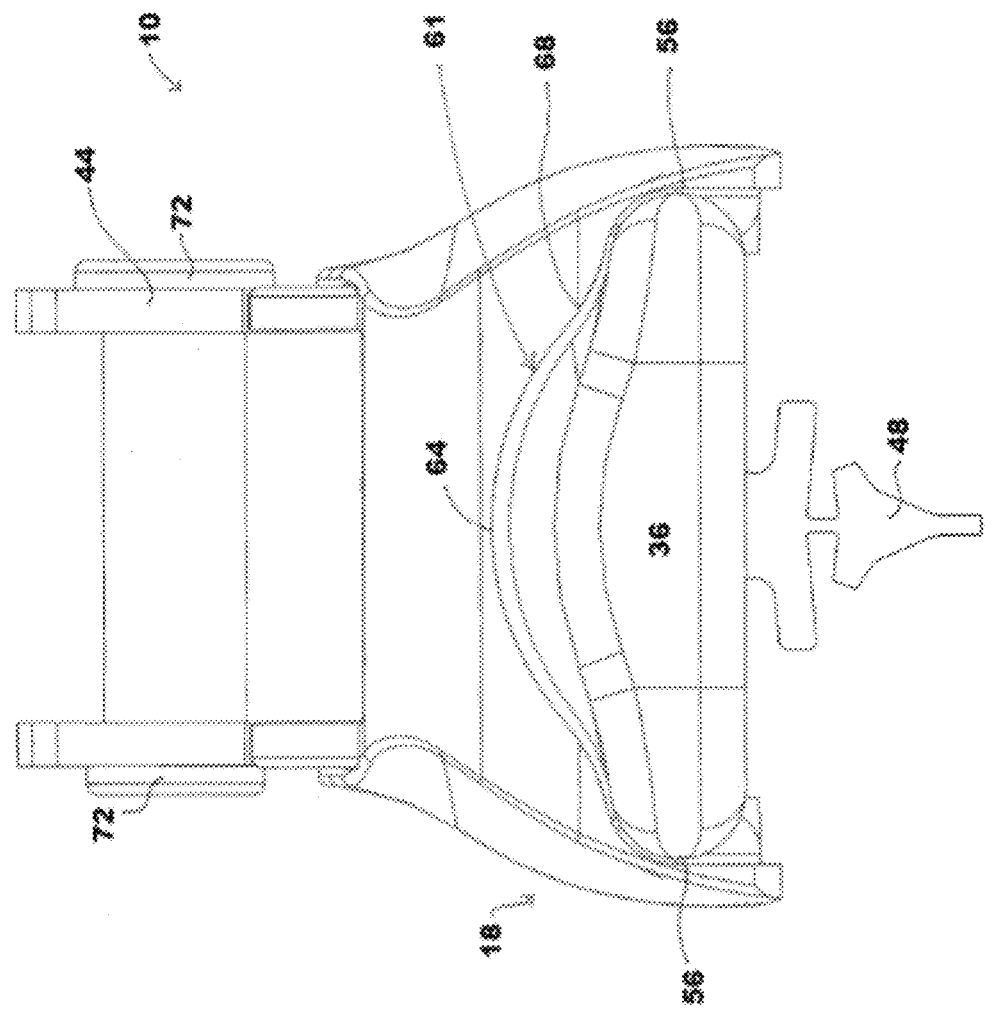
FIG. 7 illustrates a right end view of a second embodiment of a slim profile wiper blade of the present invention.
Figure 8:
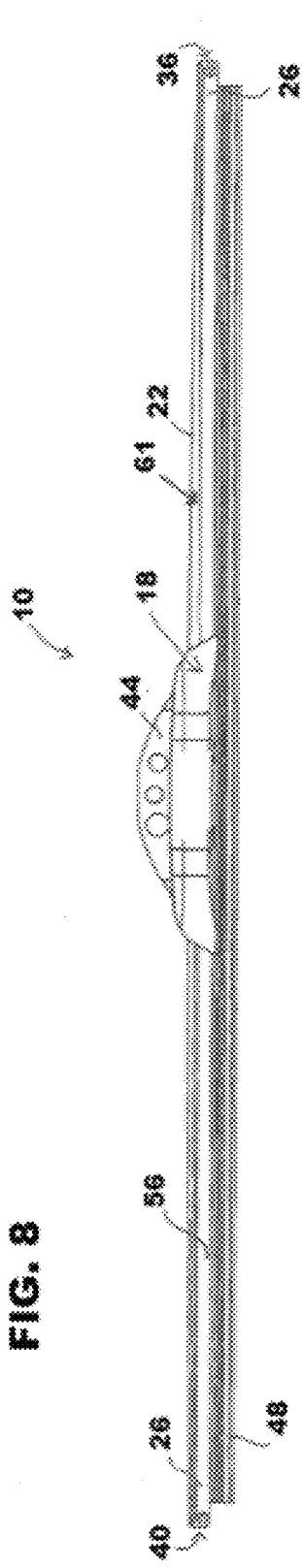
FIG. 8 illustrates a front view of a second embodiment of a slim profile wiper blade of the present invention.
Figure 9:
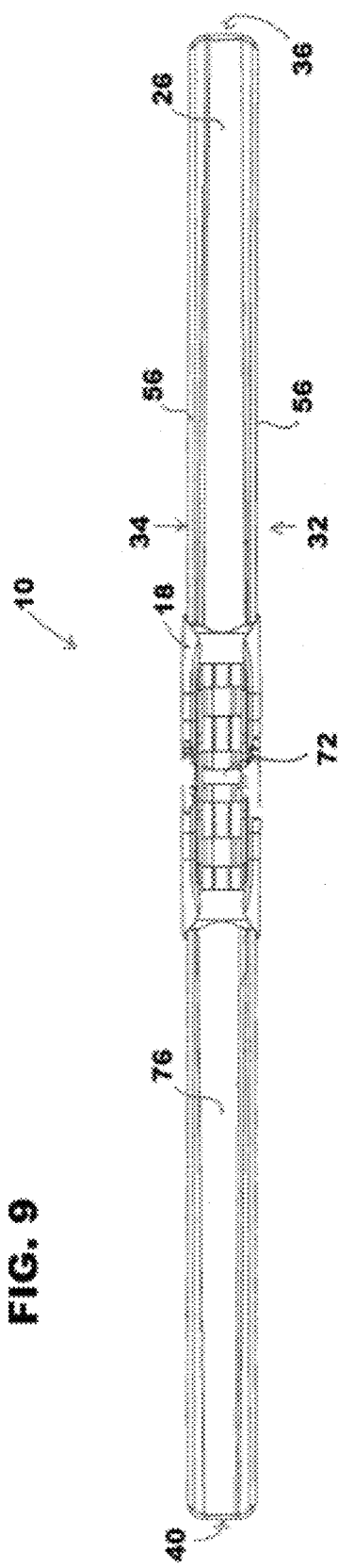
FIG. 9 illustrates a top view of a second embodiment of a slim profile wiper blade of the present invention.

FIGS. 6-10 depict a second preferred embodiment of the wiper blade 10 having an upper surface 76 with a pedestal or base region that supports and defines the outer boundary of the tapered raised portion 61. As best illustrated in FIGS. 6 and 8, tapered raised portion 61 provides a gradual taper that extends nearly the entire length between right end 36 and left end 40. As detailed in connection with the first preferred embodiment, the novel low-profile, slim design of tapered raised portion 61 provides minimized or negligible vortex at the leeward side of wiper blade 10. Further, the gradual taper of the tapered raised portion 61, which is even less pronounced than the taper of the first preferred embodiment described above, provides exceptionally low drag and drastically limits vortex formation on the leeward edge. As best shown in FIGS. 8-10, the second preferred embodiment of the wiper blade 10 includes partially blunted ends 36 and 40. Because this second-preferred embodiment does not have a spoiler, or wind deflector, such embodiments preferably maintain a low profile. The distance from the bottom of the wiper strip to the highest point of the raised portion is preferably less than one inch, and is more preferably a half-inch or less.

As discussed above in connection with the first embodiment of the invention, in certain embodiments, the cover 22 may comprise two sections, each having inner ends in the vicinity of the central bridge 44 of the wiper blade, such that there is a gap between the inner ends of the cover sections which accommodates the central bridge 44. In such embodiments the cover 22 may be provided with a covering cap 18 which covers that gap and the inner ends of the cover sections. The covering cap is provided with a hole to receive the central bridge, and may optionally be extended upwards to also cover the connection area including the central bridge 44, connector 14 (if any) and the wiper arm. Alternatively, the cover 22 may be embodied as a unitary structure, obviating the need for a covering cap.

As also discussed above in connection with the first embodiment, the height of the tapered raised portion 61 may recede into the height of the base portion of the top surface of the cover 22 in the vicinity of (either before the end of or at the end of) the outer ends of the cover such that the tapered raised portion 61 merges with the base portion. Alternatively, the height of the tapered raised portion 61 may still be greater than the height of the base portion of the top surface of the cover at the ends of the cover 22.

As shown in FIGS. 3 and 10, the bottom of the beam 80 may receive and secure the wiper strip 48. The beam 80 is attached to the central bridge 44 at joints 88. These joints may be crimped or welded to the beam, shaped to fit notches in the beam or attached via any other method currently known in the art. It will also be apparent to one of skill in the art that the central bridge 44 is preferably in the middle of the beam 80, but may be located anywhere along the length of the beam 80.

The beam 80 is preferably made from a spring metal, and is generally rectangular, but may taper. The beam 80 may comprise a single strip, or may be two strips that are held together by the central bridge 44, or other bridging devices (not shown) on the ends, or along the length of the beam 80. If a single beam is used, it may be "U" or "O"-shaped, having a groove running longitudinally along the middle of the beam, such that a wiper strip 48 can be slid in between the groove between the sides of the "U" or "O". Alternatively, where the beam 80 may have no such groove, and the wiper strip may be secured to the bottom of the beam 80 by glue or clips, or any other methods currently known in the art for securing the wiper strip to the beam 80.

Cover 22, in turn is fitted or seated on and around the perimeter of beam 80. The cover 22 may be fitted or seated to the ends of the beam 80 by means of detents, securing cavities 28, claws, or other methods currently known in the art. As shown in FIGS. 3 and 10, the cover 22 may be provided with claws which run along the longitudinal sides (i.e. front and rear edges 32, 34 of the beam), and grip it along its length. The claws may run around the entire perimeter of the wiper blade (not shown), or as shown in FIGS. 3 & 10, the claws may end in the vicinity of the outer ends of the cover. Additionally, securing structures, such as detents or securing cavities (28) may be provided on the outer ends of the cover 22 which grip and secure the ends of the beam 80. Optionally, cover 22 can be provided with an interior recess to receive an upper portion of wiper strip 48 and further secure the cover along its entire or a portion of its length. These and other methods of attaching a cover 22 to the surface of a beam 80 may be used and are considered within the scope of the invention. The cover 22 may be made of any suitable material, including natural or synthetic rubber or plastic or any other suitable polymeric material.

It is intended that the foregoing detailed description be regarded as illustrative rather than limiting, and that it be understood that it is the following claims, including all equivalents, that are intended to define the spirit and scope of this invention.

We claim:

1. A wiper blade comprising:
   a beam having two ends, two longitudinal sides, a top side and a bottom side;
   a central bridge disposed on the top side of the beam;
   a wiper strip disposed on the bottom side of the beam;
   a cover having two longitudinal sides, two outer ends and a top surface;
   wherein:
      the cover is disposed on the top side of the beam;
      the top surface of the cover has a base portion having a height and a raised portion having a height wherein the height of the raised portion is greater than the height of the base portion;
      the height of the raised portion gradually decreases as the raised portion approaches the outer ends of the cover; and
      wherein the raised portion has an apex that merges with the base portion before the outer ends of the cover such that multiple cross-sections of the top surface of the cover have a substantially geometrically similar cross-sectional profile along a length of a longitudinal axis that is parallel to the two longitudinal sides of the cover until the apex merges with the base portion, and wherein the base portion has a substantially constant height.

2. The wiper blade of claim 1 wherein the raised portion forms a wind deflection structure having a generally triangular shape when viewed in cross section.

3. The wiper blade of claim 1 wherein the cover is symmetric in shape across a plane that is transverse to the two longitudinal sides of the cover.

4. The wiper blade of claim 1 wherein the cover is symmetric in shape across a plane that extends vertically through the longitudinal axis.

5. The wiper blade of claim 1 wherein the cover is provided with two claws that run along the two longitudinal sides of the cover, wherein the longitudinal sides of the beam are disposed in the two claws.

6. The wiper blade of claim 5 wherein the claws end in the vicinity of the outer ends of the cover, and wherein the outer ends of the cover are provided with a structure that secures the ends of the beam.

7. The wiper blade of claim 1 wherein the cover is a unitary structure and is provided with a hole to accommodate the central bridge of the wiper blade.

8. The wiper blade of claim 1 wherein the cover comprises two sections, each section having an inner end, wherein a gap is provided between the inner ends of the two sections to accommodate the central bridge.

9. The wiper blade of claim 8 wherein a cap is provided that covers the gap and the inner ends of the two sections.

10. A wiper blade cover comprising two longitudinal sides, two outer ends and a top surface;
wherein:
the cover is capable of being disposed on the top side of a beam;
the top surface of the cover has a base portion having a height and a raised portion having a height wherein the height of the raised portion is greater than the height of the base portion;
the height of the raised portion gradually decreases as the raised portion approaches the outer ends of the cover; and
wherein the raised portion has an apex that merges with the base portion before the outer ends of the cover such that multiple cross-sections of the top surface of the cover have a substantially geometrically similar cross-sectional profile along a length of a longitudinal axis that is parallel to the two longitudinal sides of the cover until the apex merges with the base portion, and wherein the base portion has a substantially constant height.

11. The wiper blade cover of claim 10 wherein the raised portion forms a wind deflection structure having a generally triangular shape when viewed in cross-section.

12. The wiper blade cover of claim 10 wherein the cover is symmetric in shape across a plane that is transverse to the two longitudinal sides of the cover.

13. The wiper blade cover of claim 10 wherein the cover is provided with two claws that run along the two longitudinal sides of the cover, wherein the claws are capable of receiving the longitudinal sides of a beam.

14. The wiper blade of claim 13 wherein the claws end in the vicinity of the outer ends of the cover, and wherein the outer ends of the cover are provided with a structure capable of securing the ends of the beam.

15. The wiper blade cover of claim 10 wherein the cover is a unitary structure and is provided with a hole to accommodate the central bridge of the wiper blade.

16. The wiper blade cover of claim 10 wherein the cover comprises two sections, each section having an inner end, wherein a gap is provided between the inner ends of the two sections to accommodate a central bridge of a wiper blade.

17. The wiper blade cover of claim 16 wherein the cover further comprises a cap that covers the gap and the inner ends of the two sections.

18. The wiper blade cover of claim 10, wherein the top surface of the cover has a similar cross-sectional profile along a longitudinal axis that is parallel to the two longitudinal sides of the wiper blade.

19. A wiper blade comprising:
a beam having two ends, two longitudinal sides, a top side and a bottom side;
a central bridge disposed on the top side of the beam;
a wiper strip disposed on the bottom side of the beam;
a cover having two longitudinal sides, two outer ends, a top surface, and two claws;
wherein:
the two claws run along the two longitudinal sides of the cover, and the longitudinal sides of the beam are disposed in the two claws;
the cover is disposed on the top side of the beam;
the top surface of the cover has a base portion having a height and a raised portion having a height wherein the height of the raised portion is greater than the height of the base portion;
the height of the raised portion gradually decreases as the raised portion approaches the outer ends of the cover such that multiple cross-sections of the top surface of the cover having a substantially geometrically similar cross-sectional profile along a length of a longitudinal axis that is parallel to the two longitudinal sides of the cover until the raised portion merges with the base portion; and
wherein the claws end in the vicinity of, but at a distance from, the outer ends of the cover, and wherein the outer ends of the cover are provided with a structure that secures the ends of the beam such that the claws end before and are separate from the structure that secures the end of the beam.

20. The wiper blade of claim 19 wherein the raised portion has an apex that merges with the base portion before the outer ends of the cover such that the apex has a substantially constant shape, and wherein the base portion has a substantially constant height.

* * * * *